United States Patent
Yanamoto et al.

(10) Patent No.: US 7,536,466 B2
(45) Date of Patent: May 19, 2009

(54) SENDING-RECEIVING SYSTEM, SENDER APPARATUS, SENDING METHOD, RECEIVER APPARATUS, RECEIVING METHOD, RECORDING MEDIUM, AND PROGRAM FOR IMPROVING COMMUNICATION RELIABILITY

(75) Inventors: Kaoru Yanamoto, Kanagawa (JP); Tsuyoshi Masato, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 10/549,879

(22) PCT Filed: Mar. 12, 2004

(86) PCT No.: PCT/JP2004/003350

§ 371 (c)(1),
(2), (4) Date: Sep. 16, 2005

(87) PCT Pub. No.: WO2004/084516

PCT Pub. Date: Sep. 30, 2004

(65) Prior Publication Data
US 2006/0179151 A1 Aug. 10, 2006

(30) Foreign Application Priority Data
Mar. 18, 2003 (JP) ............................ 2003-073075

(51) Int. Cl.
*G06F 15/16* (2006.01)

(52) U.S. Cl. ...................................... 709/230; 709/201

(58) Field of Classification Search ................. 709/201, 709/23, 230
See application file for complete search history.

(56) References Cited

U.S. PATENT DOCUMENTS 5,715,257 A 2/1998 Matsuki et al.
6,898,204 B2 * 5/2005 Trachewsky et al. ........ 370/445

FOREIGN PATENT DOCUMENTS

EP 0 707 394 4/1996

(Continued)

OTHER PUBLICATIONS

Schulzrinne, H. et al. "Request for Comments (RFC) 1889: RTP: A Transport Protocol for Real-Time Applications", Network Working Group, Jan. 1996, 75 pages.*

*Primary Examiner*—George C Neurauter, Jr.
(74) *Attorney, Agent, or Firm*—Frommer Lawrence & Haug LLP; William S. Frommer; Thomas F. Presson

(57) ABSTRACT

A sending-receiving system, a sender apparatus, a sending method, a receiver apparatus, a receiving method, a recording medium, and a program for improving the reliability of communication. A TS packet sequence furnished with an RTP header includes audio data. The audio data alone constitutes a TS packet sequence having the RTP header as well. That is, an RTP packet having the same sequence number of, for example, "1235h" is transmitted twice in a row. If the receiving side can receive at least one of the two RTP packets thus transmitted, that means the audio data has been sent intact. This arrangement makes it possible to prevent disconnections of audio being offered to the user. The invention applies to both the transmitting and the receiver apparatus for sending and receiving data therebetween.

13 Claims, 19 Drawing Sheets

FOREIGN PATENT DOCUMENTS

| | | |
|---|---|---|
| JP | 8-213973 | 8/1996 |
| JP | 10-22983 | 1/1998 |
| JP | 11 225161 | 8/1999 |
| JP | 11-234249 | 8/1999 |
| JP | 2001 268121 | 9/2001 |
| JP | 2002 77258 | 3/2002 |
| JP | 2002 247134 | 8/2002 |
| JP | 2002 262286 | 9/2002 |

* cited by examiner

FIG. 5

| V | P | X | CC | M | PT | Sequence Number |
|---|---|---|----|---|----|----------------|
| Time Stamp ||||||||
| SSRC (Synchronization Source Identifier) ~42 |||||||
| CSRC (Contributing Source Identifiers) |||||||

FIG.6

| SRC PORT (16 bits) | DEST PORT (16 bits) |
|---|---|
| Length (16 bits) | Checksum (16 bits) |

| SEQUESNCE NO. | |
|---|---|
| 1 | TS PACKET 51-1-1 |
|  | TS PACKET 51-2-1 |
|  |  |
|  | TS PACKET 51-7-1 |
| 2 | TS PACKET 51-1-2 |
|  | TS PACKET 51-2-2 |
|  |  |
|  | TS PACKET 51-7-2 |
| 3 |  |
| 4 | TS PACKET 51-1-4 |
|  |  |
|  | TS PACKET 51-7-4 |
|  |  |

~87

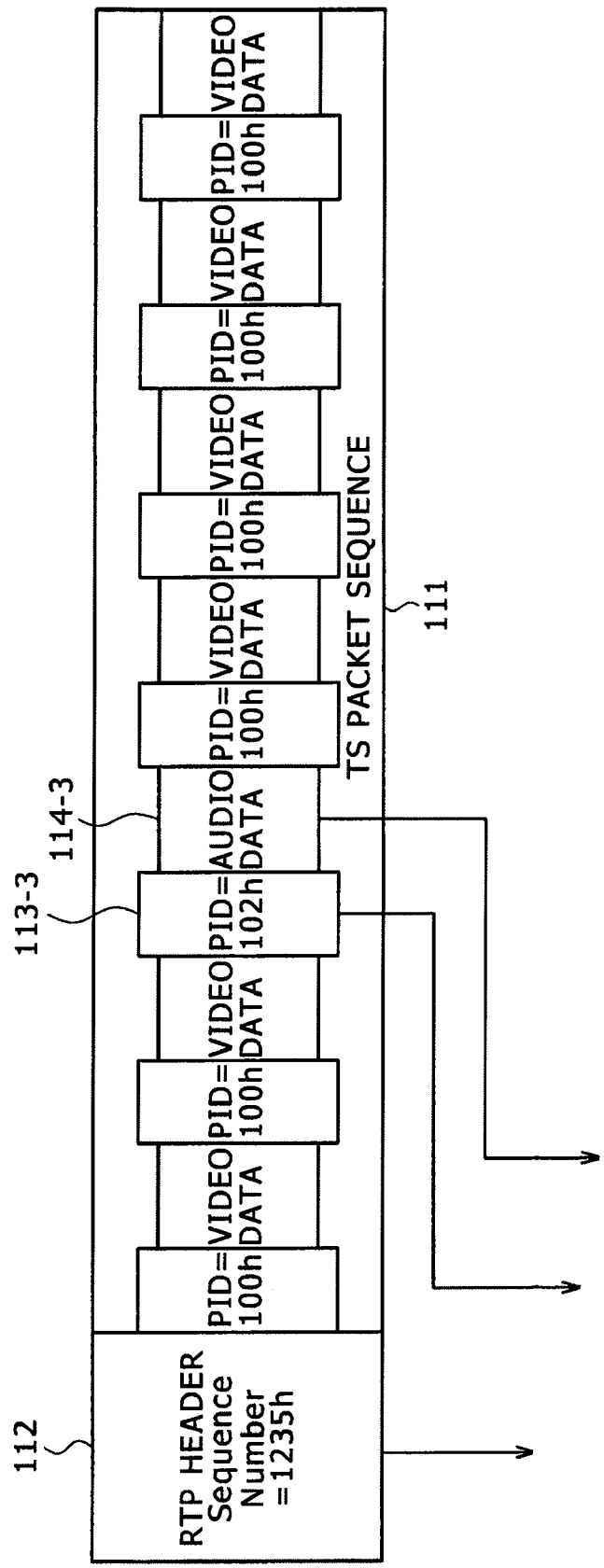

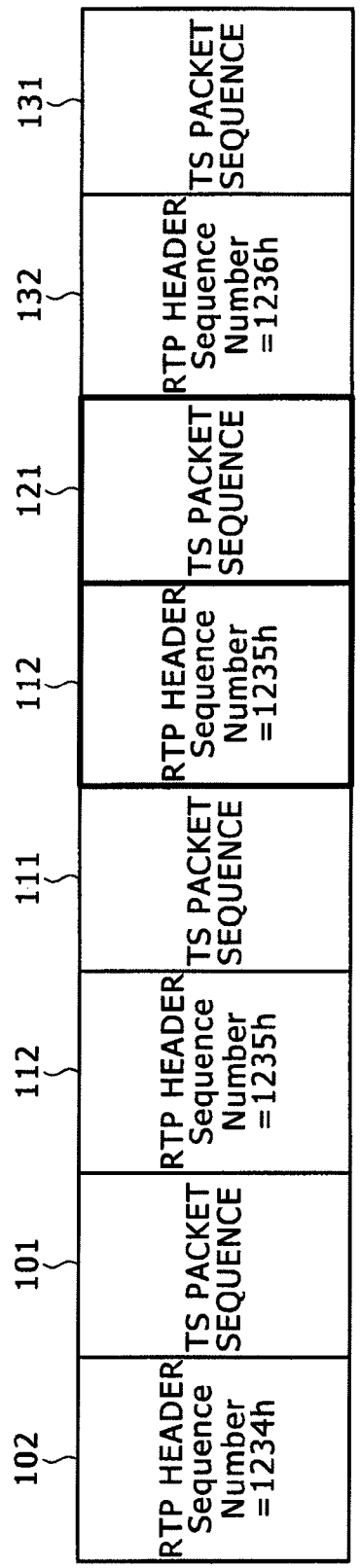

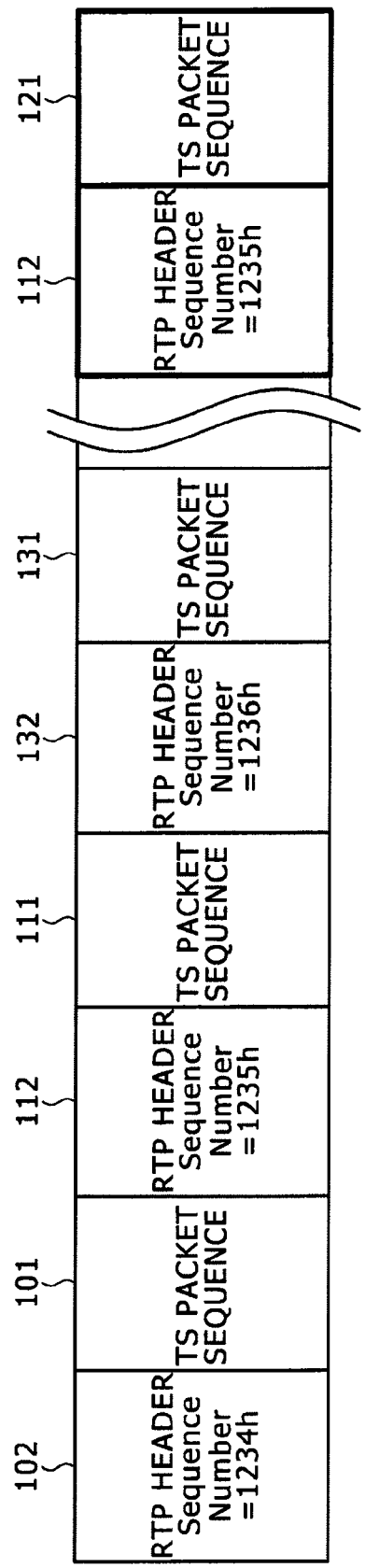

SENDING-RECEIVING SYSTEM, SENDER APPARATUS, SENDING METHOD, RECEIVER APPARATUS, RECEIVING METHOD, RECORDING MEDIUM, AND PROGRAM FOR IMPROVING COMMUNICATION RELIABILITY

TECHNICAL FIELD

The present invention relates to a sending-receiving system, a sender apparatus, a sending method, a receiver apparatus, a receiving method, a recording medium, and a program. More particularly, the invention relates to a sending-receiving system, a sender apparatus, a sending method, a receiver apparatus, a receiving method, a recording medium, and a program for compensating data packets having gone missing during transmission or reception.

BACKGROUND ART

Electronic networks have gained widespread acceptance today, and more and more services are being offered on these networks. Some networks are structured in wired fashion; others are constituted wirelessly.

With the networks coming into general use, there has been a need for improving the reliability of communication over any of the networks being used. For example, if some fault occurs on a network path over which target data is being transmitted, other paths are arranged to be formed so that the same data may be transmitted over the alternative paths to its destination in order to prevent data dropouts (as described illustratively in Japanese Published Unexamined Patent Application No. Hei 11-98161).

In recent years, wireless LANs (local area networks) have become popular as household networks because this type of network is easier to install than its wired counterpart. However, because of its particular characteristics, the wireless LAN tends to be less reliable than the wired LAN.

For example, a wireless LAN setup obviously involves sending and receiving data wirelessly. The status of communication in that setup can easily deteriorate if a person crosses a data path between a transmitter and a receiver in communication or if humidity or other ambient factors in the household change significantly. The worsening state of communication can result in data dropouts or other irregularities during transmission or reception (i.e., communication).

Methods have been proposed and implemented for compensating video data that went missing for some reason during transmission or reception. For example, if data encoded using the MPEG (Moving Picture Experts Group) standard is to be decoded and if any video stream to be decoded has a missing packet, reproduction of that video stream is continued by supplementing it with the frame preceding that of the missing packet or some of the blocks in the preceding frame.

Such error-disguising methods may be adopted by the decoder that processes video streams. This makes it possible to prevent inconvenience such as discontinuation of video presented to the user.

On the other hand, errors caused by missing audio (data) packets cannot be disguised effectively by the same measures as those for addressing video data. Few effective methods have been proposed to compensate for missing audio packets. As a result, users are often left with unresolved irregularities stemming from missing audio data such as audio disconnections.

DISCLOSURE OF INVENTION

The present invention has been made in view of the above circumstances and provides arrangements for transmitting a given set of data a plurality of times (i.e., redundant transmission) so as to prevent irregularities such as disconnections of video or audio offered to the user.

According to a first embodiment of the present invention, there is provided a sending-receiving system including a sender apparatus for transmitting data and a receiver apparatus for receiving the data transmitted by the sender apparatus; wherein the sender apparatus includes: an acquiring section for acquiring the data; a supplementing section for supplementing the data acquired by the acquiring section with sequence information for indicating a sequence of the data; a sending section for transmitting to the receiver apparatus the data supplemented with the sequence information by the supplementing section; a storing section for storing the data supplemented with the sequence information by the supplementing section; and an ordering section for ordering the sending section to transmit the data retrieved from the storing section upon elapse of a predetermined time period following transmission of the data by the sending section; and wherein the receiver apparatus includes: a receiving section for receiving the data transmitted by the sending section; a determining section for determining whether or not the data received by the receiving section has been received already based on the sequence information extracted from the data; and a storage controlling section for discarding the data if the data received by the receiving section is found already received, the storage controlling section further storing the data if the data received by the receiving section is not found received already.

According to a second embodiment of the present invention, there is provided a sender apparatus including: an acquiring section for acquiring data; a supplementing section for supplementing the data acquired by the acquiring section with sequence information for indicating a sequence of the data; a sending section for transmitting the data supplemented with the sequence information by the supplementing section; a storing section for storing the data supplemented with the sequence information by the supplementing section; and an ordering section for ordering the sending section to transmit the data retrieved from the storing section upon elapse of a predetermined time period following transmission of the data by the sending section.

Preferably, the ordering section may retrieve the data from the storing section upon elapse of a predetermined time period following transmission of the data by the sending section and may order the sending section to transmit the retrieved data.

Preferably, the sender apparatus of the invention may further include a determining section for determining whether or not predetermined data is included in the data acquired by the acquiring section; wherein the storing section may store the predetermined data if the determining section determines that the predetermined data is included in the data; and wherein the ordering section may retrieve the predetermined data from the storing section and may order the sending section to transmit the predetermined data thus retrieved.

Preferably, the sender apparatus of the invention may further include a determining section for determining whether or not audio data is included in the data acquired by the acquiring section; wherein, if the determining section determines that audio data is included in the data, then the storing section may store the audio data and a header attached to the audio data; and wherein the ordering section may retrieve the header and the audio data from the storing section and may order the sending section to transmit the retrieved header and audio data.

Preferably, the header may be an RTP header.

According to a third embodiment of the present invention, there is provided a sending method including the steps of: controlling acquisition of data; supplementing the data acquired in the acquisition controlling step with sequence information for indicating a sequence of the data; controlling transmission of the data supplemented with the sequence information in the supplementing step; controlling storage of the data supplemented with the sequence information in the supplementing step; and ordering the transmission controlling step to transmit the data retrieved from storage under control of the storage controlling step upon elapse of a predetermined time period following transmission of the data in the transmission controlling step.

According to a fourth embodiment of the present invention, there is provided a recording medium which records a program in a manner readable by a computer, the program including the steps of: controlling acquisition of data; supplementing the data acquired in the acquisition controlling step with sequence information for indicating a sequence of the data; controlling transmission of the data supplemented with the sequence information in the supplementing step; controlling storage of the data supplemented with the sequence information in the supplementing step; and ordering the transmission controlling step to transmit the data retrieved from storage under control of the storage controlling step upon elapse of a predetermined time period following transmission of the data in the transmission controlling step.

According to a fifth embodiment of the present invention, there is provided a program for causing a computer to execute a procedure including the steps of: controlling acquisition of data; supplementing the data acquired in the acquisition controlling step with sequence information for indicating a sequence of the data; controlling transmission of the data supplemented with the sequence information in the supplementing step; controlling storage of the data supplemented with the sequence information in the supplementing step; and ordering the transmission controlling step to transmit the data retrieved from storage under control of the storage controlling step upon elapse of a predetermined time period following transmission of the data in the transmission controlling step.

According to a sixth embodiment of the present invention, there is provided a receiver apparatus including: receiving means for receiving data; determining means for determining whether or not the data received by the receiving means has been received already based on sequence information which is extracted from the data and which indicates a sequence of the data; and storage controlling means for discarding the data if the data received by the receiving means is found already received, the storage controlling means further storing the data if the data received by the receiving means is not found received already.

Preferably, if continuity of the data received by the receiving means is found disrupted on the basis of the sequence information, then the determining means may determine whether or not the data is the already-received data.

According to a seventh embodiment of the present invention, there is provided a receiving method including the steps of controlling reception of data; determining whether or not the data received in the reception controlling step has been received already based on sequence information which is extracted from the data and which indicates a sequence of the data; and controlling storage of the data which is discarded if the determining step determines that the data received in the reception controlling step has been received already, the storage controlling step further storing the data if the data is not found received already.

According to an eighth embodiment of the present invention, there is provided a recording medium which records a program in a manner readable by a computer, the program including the steps of: controlling reception of data; determining whether or not the data received in the reception controlling step has been received already based on sequence information which is extracted from the data and which indicates a sequence of the data; and controlling storage of the data which is discarded if the determining step determines that the data received in the reception controlling step has been received already, the storage controlling step further storing the data if the data is not found received already.

According to a ninth embodiment of the present invention, there is provided a program for causing a computer to execute a procedure including the steps of: controlling reception of data; determining whether or not the data received in the reception controlling step has been received already based on sequence information which is extracted from the data and which indicates a sequence of the data; and controlling storage of the data which is discarded if the determining step determines that the data received in the reception controlling step has been received already, the storage controlling step further storing the data if the data is not found received already.

According to the invention, a predetermined item of data is transmitted a plurality of number of times. That item of data may illustratively be audio data.

According to the invention, when the predetermined item of data has been transmitted and received a plurality of times, the already-received data is not stored again.

BRIEF DESCRIPTION OF DRAWINGS

FIG. 5 is an explanatory view of an RTP header;

FIG. 6 is an explanatory view of a UDP header;

FIG. 10 is an explanatory view of data stored in a storage unit;

FIGS. 14A and 14B are explanatory views of other packet structures;

FIG. 15 is an explanatory view of another packet structure;

FIG. 16 is an explanatory view of another packet structure;

BEST MODE FOR CARRYING OUT THE INVENTION

Figure 1:
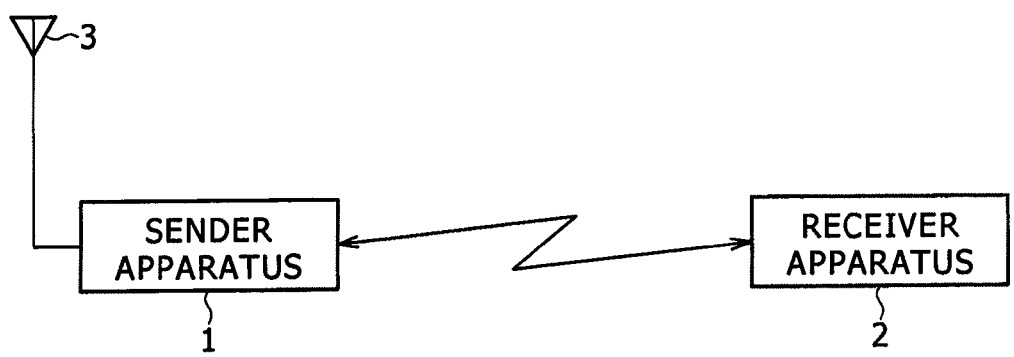
FIG. 1 is a schematic view showing a typical structure of a sending-receiving system embodying the present invention.

Preferred embodiments of the present invention will now be described with reference to the accompanying drawings. FIG. 1 is a schematic view showing a typical structure of a sending-receiving system practiced as an embodiment of the invention. The sending-receiving system of FIG. 1 is made up of a sender apparatus 1 and a receiver apparatus 2. The sender apparatus 1 receives TV broadcast data via an antenna 3 and transmits the received data to the receiver apparatus 2. The receiver apparatus 2 has presentation equipment (e.g., a display unit) and an audio output device (e.g., speakers) whereby images and sounds derived from the received data are output.

It is assumed here that analog-signal TV broadcasts are received and the data representative of the received broadcasts is sent to the receiver apparatus 2. However, this is not limitative of the invention. The present invention applies not only to analog-signal TV broadcasts but also to digital-signal TV broadcasts such as BS (broadcasting satellite) digital broadcasts, CS (communications satellite) digital broadcasts, and terrestrial digital broadcasts.

It is also possible to attach devices such as a VTR (video tape recorder) and a DVD (digital versatile disc) player to the sender apparatus 1 so that data coming from the attached devices may be transmitted and received. Furthermore, the sender apparatus 1 may be connected to a network such as the Internet and the information acquired over the connected network may also be transmitted and received.

The sender apparatus 1 and receiver apparatus 2 transmit and receive data wirelessly. The wireless communication takes place illustratively in accordance with IEEE 802.11. For example, a user may set up the sender apparatus 1 fixedly somewhere in his or her household while bringing the receiver apparatus 2 to a desired place in the house to watch TV broadcasts.

Figure 2:
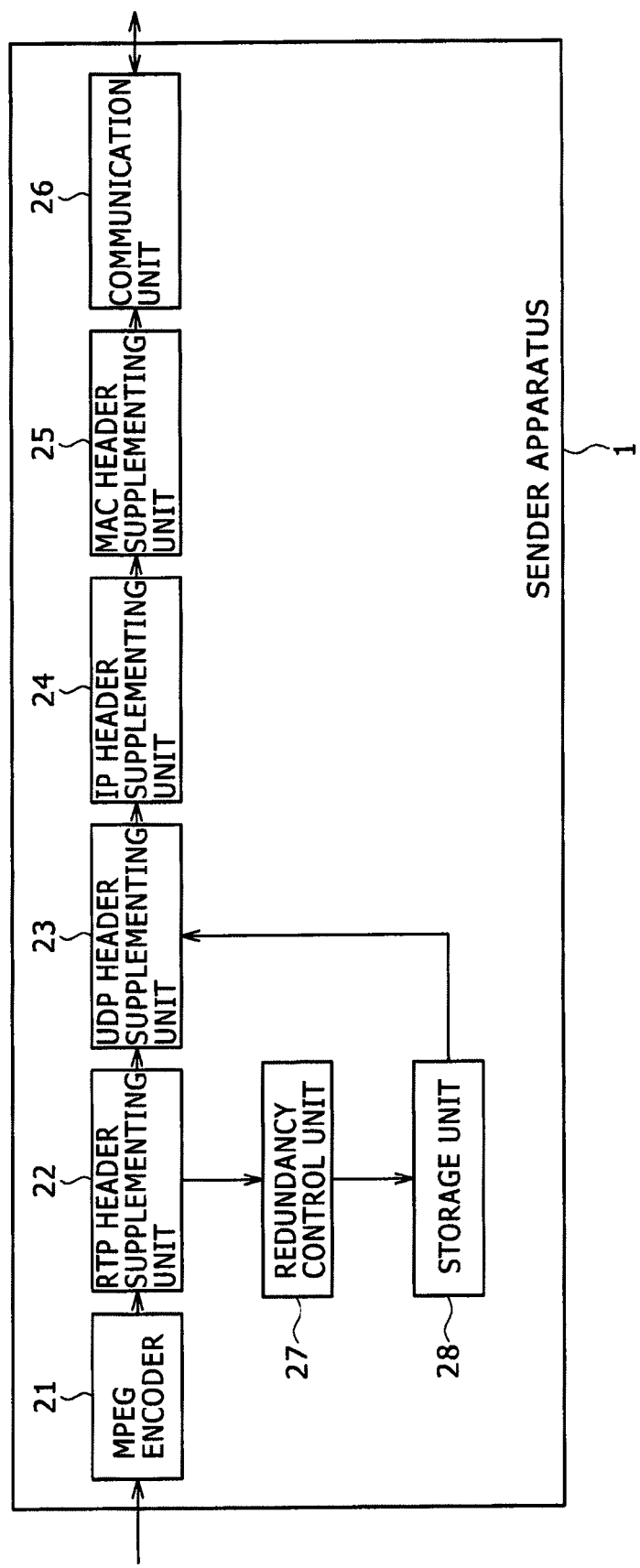
FIG. 2 is a block diagram showing a typical internal structure of a sender apparatus.

FIG. 2 shows a typical internal structure of the sender apparatus 1. The internal structure illustrated in FIG. 2 indicates major components that need to be explained in connection with this invention. The components irrelevant to the invention are not shown, such as a tuner for extracting user-designated programs from received TV broadcasts or a switcher for switching inputs from the VTR, DVD player and the like attached to the sender apparatus 1.

Data (signal) representative of the TV broadcasts received by the antenna 3 is input to the sender apparatus 1. The input signal is illustratively an analog signal that is introduced into an MPEG (Moving Picture Experts Group) encoder 21. In turn, the MPEG encoder 21 converts the input analog signal into digital data in MPEG-compressed format.

Where digital-signal TV broadcast data is input, there is no need to encode the data using the MPEG encoder 21. That means the apparatus need not be structured to let all input data pass through the MPEG encoder 21; there may be provided different ports through which to input different types of data. In that case, the sender apparatus 1 may be equipped with a switcher, not shown, for selecting the output destination to which to forward the input data.

The output from the MPEG encoder 21 is in transport stream (called TS) packet form and is supplied to an RTP (Real Time Protocol) header supplementing unit 22. The RTP header supplementing unit 22 puts a predetermined number (e.g., seven) of the supplied TS packets together and supplements the grouped packets (called a TS packet sequence) with an RTP header. The packet sequence together with its header is sent to a UDP (User Datagram Protocol) header supplementing unit 23. The TS packet sequence supplemented with the RTP header by the RTP header supplementing unit 22 may be called an RTP packet.

The UDP header supplementing unit 23 further supplements the supplied RTP packet with a UDP header, before sending the packet along with the header to an IP (Internet Protocol) header supplementing unit 24. The RTP packet supplemented with the UDP header by the UDP header supplementing unit 23 may be called a UDP packet.

The IP header supplementing unit 24 supplements the supplied UDP packet with an IP header and forwards the packet together with the header to a MAC (Media Access Control) header supplementing unit 25. The UDP packet supplemented with the IP header by the IP header supplementing unit 24 may be called an IP packet.

The MAC header supplementing unit 25 supplements the supplied IP packet with a MAC header and sends the packet along with the header to a communication unit 26. The IP packet supplemented with the MAC header by the MAC header supplementing unit 25 may be called a MAC packet.

The TS packets supplemented with the different headers at the different stages and turned into the MAC packet as described above are transmitted from the communication unit 26 to the receiver apparatus 2.

A redundancy control unit 27, to be discussed later in more detail, is provided to exert control such that predetermined data (e.g., audio data) is transmitted a plurality of number of times (i.e., target data is made redundant (multiplexed) when transmitted). The redundancy control unit 27 causes a storage unit 28 to supply packets to the UDP header supplementing unit 23 as needed. Furthermore, the redundancy control unit 27 causes the storage unit 28 to store the RTP packets coming from the RTP header supplementing unit 22.

The storage unit 28 accommodates the predetermined data to be transmitted a plurality of number of times in order to make the redundant data transmission possible. Also stored in the storage unit 28 is an RTP header corresponding to the predetermined data to be sent.

Figure 3:
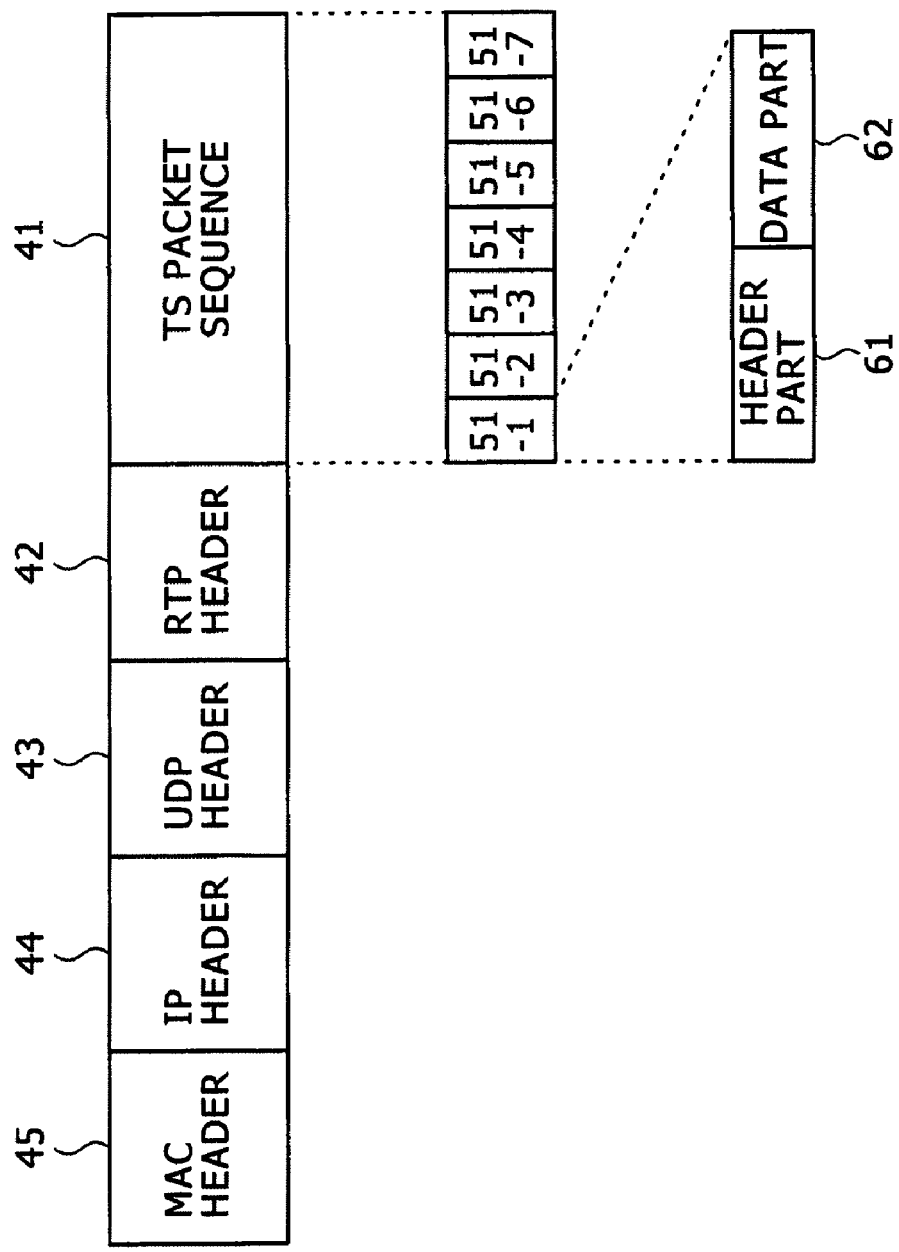
FIG. 3 is an explanatory view of data to be transmitted by the sender apparatus.

FIG. 3 is an explanatory view of typical data (MAC packet) that is fed to the communication unit 26 after undergoing the processing by a series of components ranging from the MPEG encoder 21 to the MAC header supplementing unit 25. As shown in FIG. 3, the data supplied to the communication unit 26 includes a TS packet sequence 41 encoded by the MPEG encoder 21. As mentioned above, seven TS packets 51-1 through 51-7 constitute a TS packet sequence 41 included in a MAC packet sent to the communication unit 26. Each TS packet is made up of 188 bytes.

A single TS packet 51-1 in the TS packet sequence 41 is formed by a header part 61 and a data part 62. The header part 61 includes data such as that shown in FIG. 4. The data part 61 includes video or audio data to be offered to the user by the receiver apparatus 2 (FIG. 1) as images or sounds.

Figure 4:
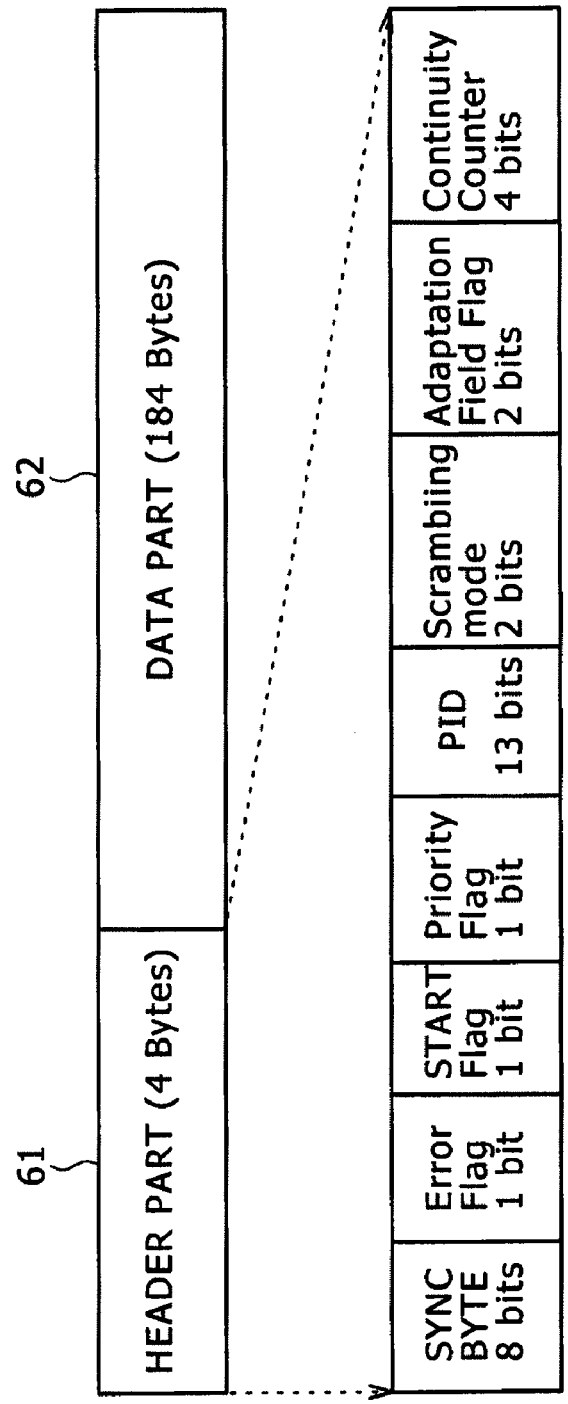
FIG. 4 is an explanatory view of a header in a TS packet.

FIG. 4 shows a typical data structure of the header part 61 in the TS packet 51. The header part 61 is constituted by 4 bytes and the data part 62 by 184 bytes. A "sync byte" field in the header part 61 serves to provide synchronization and its value is fixed illustratively at 47h. An "error flag" is a flag that indicates whether there exists any uncorrectable bit error in the TS packet 51.

A "start flag" indicates that this packet is a new PES packet or a new TS-PSI section. A "priority flag" indicates the priority of this packet. If the priority flag bit is set for 1, that means the priority of this packet is higher than the other TS packets 51. A "PID" field constitutes a 13-bit numeric value (identifier) indicating whether a payload part (i.e., data part 62) of the TS packet 51 has video data, audio data, TS-PSI (TS-program specific information), or something else.

A "scrambling mode" field has information denoting the scrambling mode of the data part 62. An "adaptation field flag" is a flag that provides information indicating the presence or absence of an adaptation field containing PCR (program clock reference) or like information. A "continuity counter" field has a counter value incremented by 1 for each packet having the same PID.

The MPEG encoder 21 (FIG. 2) converts the input analog signal into digital data. The digital data is then subjected to MPEG compression so as to generate the data part 62 and header part 61 shown in FIG. 4, whereby a single TS packet 51 is created.

FIG. 3 shows a TS packet sequence 41 made up of seven such TS packets 51. An RTP header 42 (FIG. 3) supplemented by the RTP header supplementing unit 22 (FIG. 2) has a data structure such as that shown in FIG. 5.

Reference character "V" in the RTP header 42 represents a version bit, i.e., information indicating the version number of the format in which the RTP header 42 is furnished. Reference character "P" denotes a padding bit used to adjust the size of this packet. Reference character "X" stands for an extension bit designated at function extension time.

Reference characters "CC" represent a CSRC count, i.e., information indicating the number of transmission sources involved in a real-time transmission process. Reference character "M" denotes a marker bit delimiting a frame boundary of each packet. Reference characters "PT" stand for a payload type constituting information about the type of the payload in effect. A "sequence number" field has information indicating the sequence number of the RTP packet in terms of packet sequence.

A "time stamp" field gives information about the time stamp at which the RTP header 42 was created. An "SSRC" field constitutes a synchronization source identifier indicating a synchronization source, i.e., the source of the first transmission. A "CSRC" field has contributing source identifiers that identify the destinations (clients) to which to transmit the group of packets included in a message.

The TS packet sequence 41 is inserted into the payload corresponding to the RTP header 42 having the above-mentioned items of information. The RTP packet furnished with the RTP header 42 above is further supplemented with a UDP header 43 (FIG. 3) by the UDP header supplementing unit 23 (FIG. 2).

FIG. 6 shows a typical data structure of the UDP header 43. An "SRC port" field in the UDP header 43 has information designating the port number of the transmission source. A "DEST port" field has information designating the port number of the destination to which to send data. The two fields provide information for designating the services to be used.

A "length" field has information indicating the combined length of the UDP header 43 and of the data subsequent to it (in bytes). A "checksum" field has information constituting a value calculated on the basis of the UDP header information and the data length. The receiving side does the same calculations as the sender side to calculate the checksum. A check is then made to determine whether or not the calculated value matches the checksum included in the received UDP header 43. A checksum mismatch indicates the possibility of the packet having been destroyed in transmit.

Figure 7:
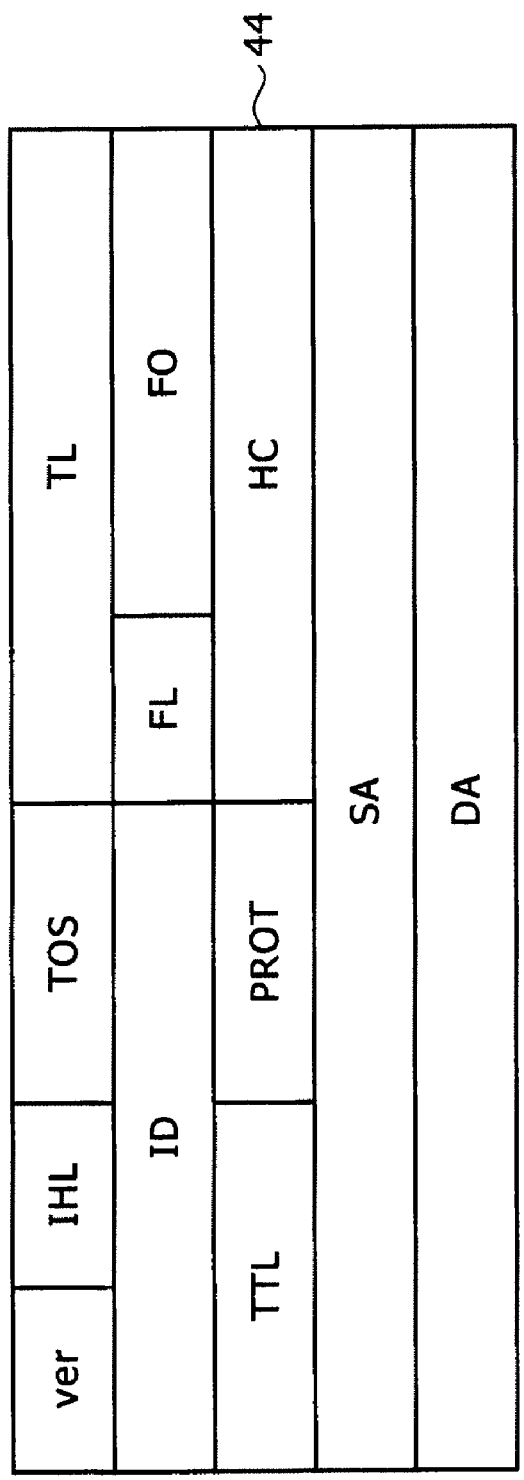
FIG. 7 is an explanatory view of an IP header.

The UDP packet furnished with the UDP header 43 above is further supplemented with the IP header 44 (FIG. 3) by the IP header supplementing unit 24 (FIG. 2). FIG. 7 shows a typical data structure of the IP header 44. The data structure of the IP header 44 in FIG. 7 indicates only basic header fields; no optional header fields are shown.

A "ver" field has information indicating the version of the Internet Protocol (IP) in use. An "IHL" field has information indicating an Internet header length, i.e., the length of this header. A "TOS" field gives information about the type of service, defining the priority of data and designating the type of transfers to be made.

A "TL" field gives information indicating a Total length, i.e., the combined length of the IP header 44 and of the data subsequent to it. An "ID" field has information identifying the IP packet indicated by the IP header 44. An "FL" field has information about control on the fragmentation of data in the IP layer.

An "FO" field gives information indicating where data is located upon its fragmentation in the IP layer. A "TTL" field gives information indicating the time to live, i.e., a time period that ends upon discarding of the data including this IP header 44. A "PROT" field has information indicating the protocol for use in layers above the IP layer.

An "HC" field gives information constituting a checksum allowing the receiving side to determine whether the IP header 44 has been destroyed during transmission. An "SA" field gives information indicating the IP address of the source from which data was transmitted. A "DA" field gives information indicating the IP address of the destination to which to transmit data.

Figure 8:
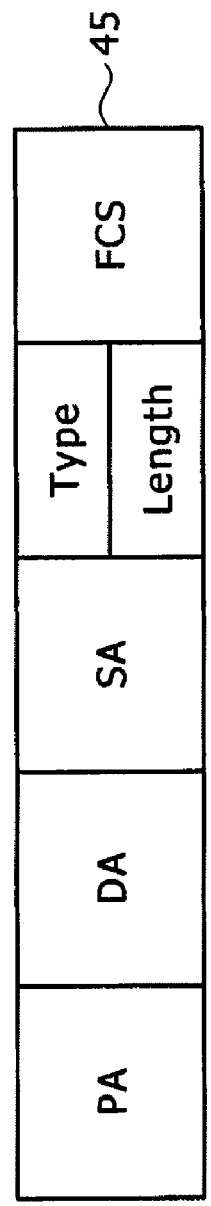
FIG. 8 is an explanatory view of a MAC header.

The IP packet furnished with the IP header 44 above is supplemented with a MAC header 45 (FIG. 3) by the MAC header supplementing unit 25 (FIG. 2). FIG. 8 shows a typical data structure of the MAC header 45.

A "PA" field provides preamble information used to lock PLL for clock recovery. A "DA" field has information indicating the MAC address of a transmission destination. An "SA" field gives information indicating the MAC address of a transmission source. A "type" field gives information indicating the protocol of an upper layer.

A "length" field has information indicating the number of bytes that make up the payload. One MAC header 45 carries either the "type" or the "length" information. An "FCS" field provides information for error checks. The data shown in FIG. 3 (i.e., MAC packet) is created with the addition of the MAC header 45 including the information described above.

For convenience of explanation, it is assumed here that the data having the structure shown in FIG. 3 is transmitted from the sender apparatus 1 to the receiver apparatus 2. Although data with its structure excluding the RTP header 42 can also be sent to the receiver apparatus 2, this embodiment of the invention assumes that data furnished with the RTP header 42 is transmitted in the format illustrated in FIG. 3.

Transmission of data supplemented with the RTP header 42 is a precondition under which the embodiment of this invention implements one of its features. That is, predetermined data (packet) is to be sent a plurality of number of times through the use of information within the RTP header 42 (more specifically, the "sequence number" shown in FIG. 5 is used).

The UDP header 43 could be replaced by a TCP (Transmission Control Protocol) header. However, the embodiment of this invention opts to utilize the UDP header 43 shown in FIG. 3.

The outgoing data is supplemented not with the TCP header but with the UDP header for the following reason: The TCP header is furnished when TCP is utilized as the transport layer protocol, whereas the UDP header is provided when UDP is employed as the transport layer protocol.

Whether TCP or UDP is to be used as the transport layer protocol depends in part on what kind of data is transmitted and received during communication processes pursuant to the protocol. TCP may be called a connection type protocol and UDP a connectionless type protocol.

Being a connection type protocol, TCP requires complicated procedures in processing data exchanges but ensures higher degrees of reliability during communication processes. As such, TCP is employed primarily for communications that give priority to dependability. As opposed to TCP, UDP as a connectionless type protocol entails much simplified procedures in processing data exchanges while reducing the time required for communication. That is, UDP is utilized principally for communications that give priority to processing speed.

With this embodiment of the invention, TV broadcast data received by the sender apparatus 1 is transmitted to the receiver apparatus 2 as mentioned above. For that reason, UDP is adopted as the protocol giving priority to processing speed rather than to the reliability in real-time data exchanges.

During communication processes under UDP, however, the sender apparatus 1 keeps transmitting data successively whether or not the data is being actually received by the receiver apparatus 2. The receiver apparatus 2 could fail to receive some of the data that is being sent continuously. If the receiver apparatus 2 proceeds with its processing without acquiring the missing data, the images or sounds offered to the user could be interrupted or otherwise disturbed. These irregularities should be avoided if at all possible.

With this embodiment of the invention, even if UDP is adopted as the protocol giving priority in real-time data exchanges, the receiving side is arranged to recover the data that has been lost somehow in transmit during communication under UDP. During the data recovering process, the sender and the receiver sides are prevented from being overloaded through inventive arrangements.

Figure 9:
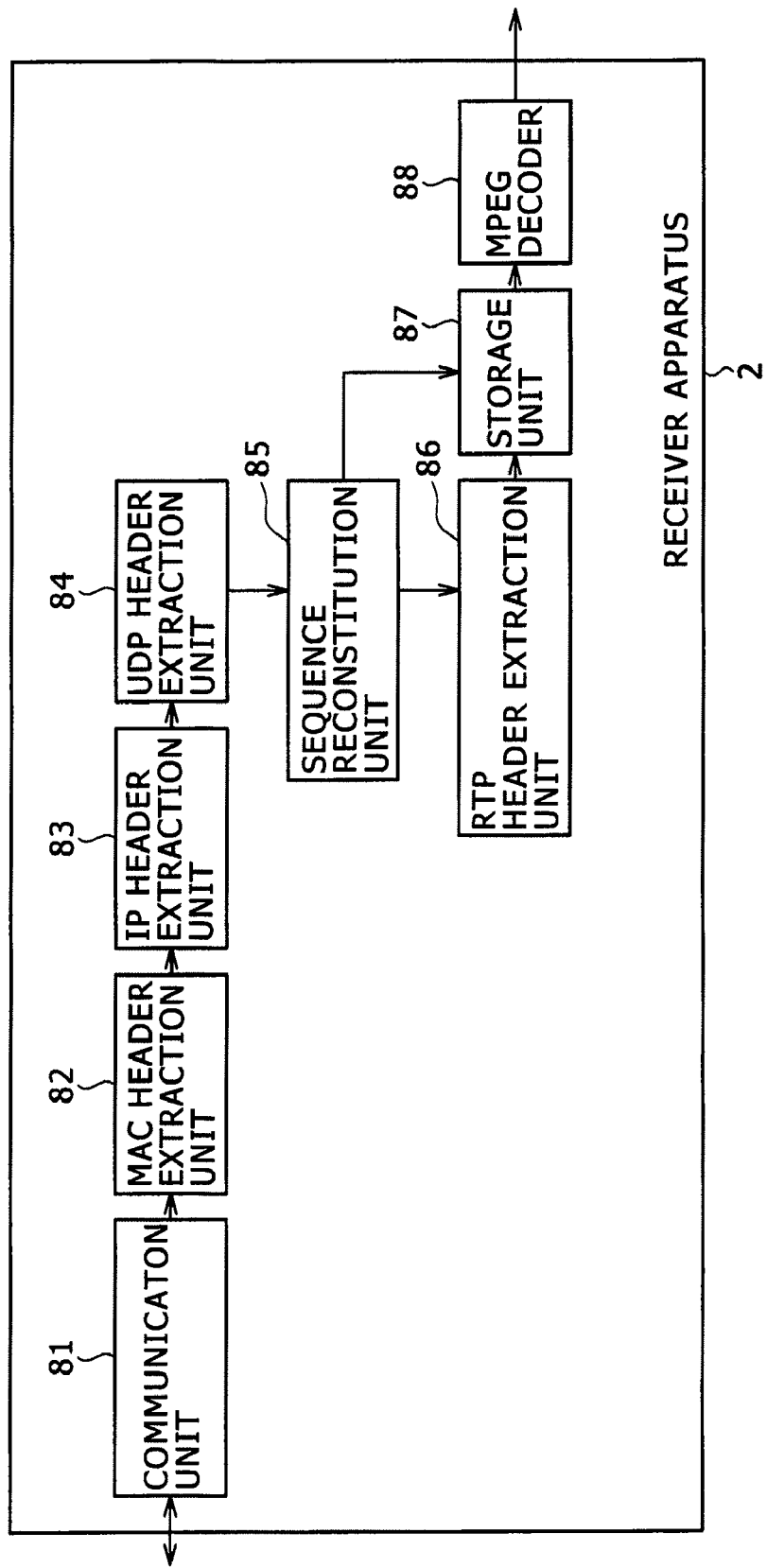
FIG. 9 is a block diagram showing a typical internal structure of a receiver apparatus.

What follows is a description of a receiver apparatus 2 having the above-mentioned capability to acquire the missing data from the sender apparatus 1 whose structure is shown in FIG. 2. FIG. 9 shows a typical internal structure of the receiver apparatus 2. A communication unit 81 of the receiver apparatus 2 receives data from the sender apparatus 1. The data received by the communication unit 81 from the sender apparatus 1, structured as shown in FIG. 3, is fed to a MAC header extraction unit 82. The MAC header extraction unit 82 extracts a MAC header 45 (FIG. 3) from the supplied data (i.e., MAC packet) and forwards the resulting IP packet devoid of the MAC header to an IP header extraction unit 83.

The IP header extraction unit 83 extracts an IP header 44 from the supplied IP packet and sends the resulting UDP packet to a UDP header extraction unit 84. The UDP header extraction unit 83 extracts a UDP header 43 from the supplied UDP packet and supplies the resulting RTP packet to a sequence reconstitution unit 85.

The sequence reconstitution unit 85 references the "sequence number" field (FIG. 5) in the RTP header 42. The sequence numbers are generally serial numbers assigned in ascending order to packets (i.e., RTP headers 42), i.e., in the order in which the packets were processed by the sender apparatus 1. Alternatively, the sequence numbers may be assigned in descending order to the packets.

The sequence reconstitution unit 85 references the sequence number in the supplied RTP packet and determines whether a storage unit 87 holds the data having the same number as the referenced sequence number (i.e., corresponding data). If the corresponding data is found to exist in the storage unit 87, the sequence reconstitution unit 85 discards the supplied RTP packet. If the corresponding data is not found in the storage unit 87, the sequence reconstitution unit 85 forwards the supplied RTP packet to an RTP header extraction unit 86.

The RTP header extraction unit 86 extracts the RTP header 42 from the supplied RTP packet and stores the resulting TS packet sequence 41 into the storage unit 87. The TS packet sequence 41 thus placed into the storage unit 87 is stored in conjunction with the sequence number included in the RTP header 42.

The storage unit 87 usually accommodates one TS packet sequence 41, i.e., seven TS packets 51. In case of an error, less than seven TS packets 51 may be found in the storage unit 87.

The storage unit 87 serves as a buffer that outputs the TS packets 51 successively to an MPEG decoder 88. The MPEG decoder 88 decodes the successively supplied TS packets 51 in accordance with the MPEG standard. The output from the MPEG decoder 88 is fed to a display unit and speakers, not shown, as images and sounds offered to the user.

What follows is an explanation of the data held in the storage unit 87. FIG. 10 is an explanatory view depicting a typical structure of the data stored in the storage unit 87. In the storage unit 87, as mentioned above, the sequence number included in the RTP header 42 is stored in conjunction with the TS packets contained in that RTP packet corresponding to the sequence number.

The sequence numbers held in the storage unit 87 may be either the sequence numbers themselves or some suitable data uniquely representative of these sequence numbers.

Illustratively, as shown in FIG. 10, sequence number "1" is stored in conjunction with TS packets 51-1-1 through 51-7-1 (the last digit of the reference numeral for each packet denotes a sequence number (hence the same numeral)). That is because the embodiment of this invention assumes that each RTP packet (i.e., MAC packet received by the receiver apparatus 2) includes seven TS packets 51-1 through 51-7. (FIG. 3). If eight TS packets were assumed to be included in one RTP packet, then sequence number "1" would be stored in association with eight TS packets 51-1-1 through 51-8-1.

Referring again to FIG. 10, sequence number "2" is stored likewise in conjunction with seven TS packets 51-1-2 through 51-7-2. Sequence number "3," however, has no TS packets stored in connection therewith in the example of FIG. 10 although TS packets 51-1-3 through 51-7-3 would be thought of by association. Sequence number "4" is held in conjunction with TS packets 51-1-4 through 51-7-4.

As described, the TS packets 51 (as the TS packet sequence 41) that have been received and processed normally are stored in suitable areas in the storage unit 87 in conjunction with the corresponding sequence number. That is, the TS packets are stored in the order in which their sequence numbers occur in series. If for some reason any TS packets have not been received normally, nothing is stored in connection with the corresponding sequence number (e.g., the area associated with sequence number "3" has no packets stored in FIG. 10).

In the storage unit 87, as described, the sequence numbers related to the areas having TS packets stored therein coexist with the sequence numbers corresponding to the areas with no packets stored. In such a setup, it is possible to distinguish the sequence numbers regarding the areas in which TS packets are stored, from the sequence numbers regarding the areas without TS packets, through the use of a flag indicating the presence or absence of TS packets. That flag may also be used in processes to be discussed later.

What follows is a description of how the sender apparatus 1 (its structure shown in FIG. 2) and receiver apparatus 2 (its structure in FIG. 9) operate in transmitting and receiving the data explained above with reference to FIGS. 3 through 8. How the sender apparatus 1 functions is described first.

The sender apparatus 1 supplements TV broadcast data received via the antenna 3 with headers before sending the header-furnished data to the receiver apparatus 2. A predetermined part of the transmitted data is sent a plurality of times (e.g., twice here, for purposes of description). The manner in which that part of the data is sent every time is explained below.

The TV broadcast data received by the antenna 3 is encoded by the MPEG encoder 21 based on the MPEG standard. The encoded data is output as TS packets 51 to the RTP header supplementing unit 22. The RTP header supplementing unit 22 turns every seven input TS packets 51 into a TS packet sequence 41, and supplements the TS packet sequence 41 thus generated with an RTP header 42.

Figure 11:
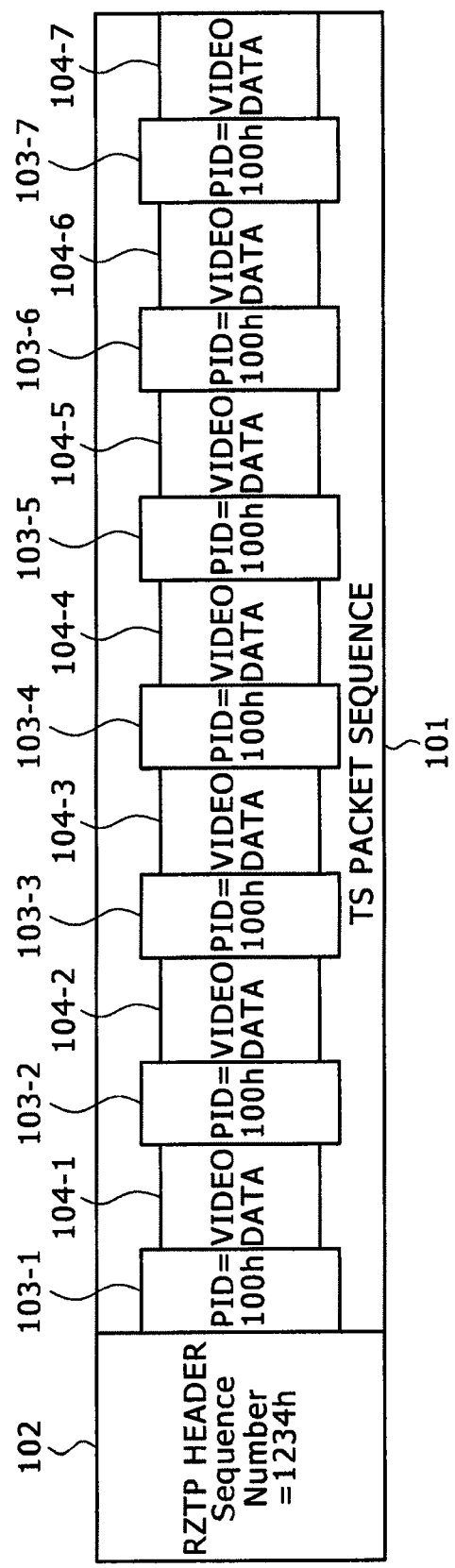
FIG. 11 is an explanatory view of a packet structure.
Figure 12:
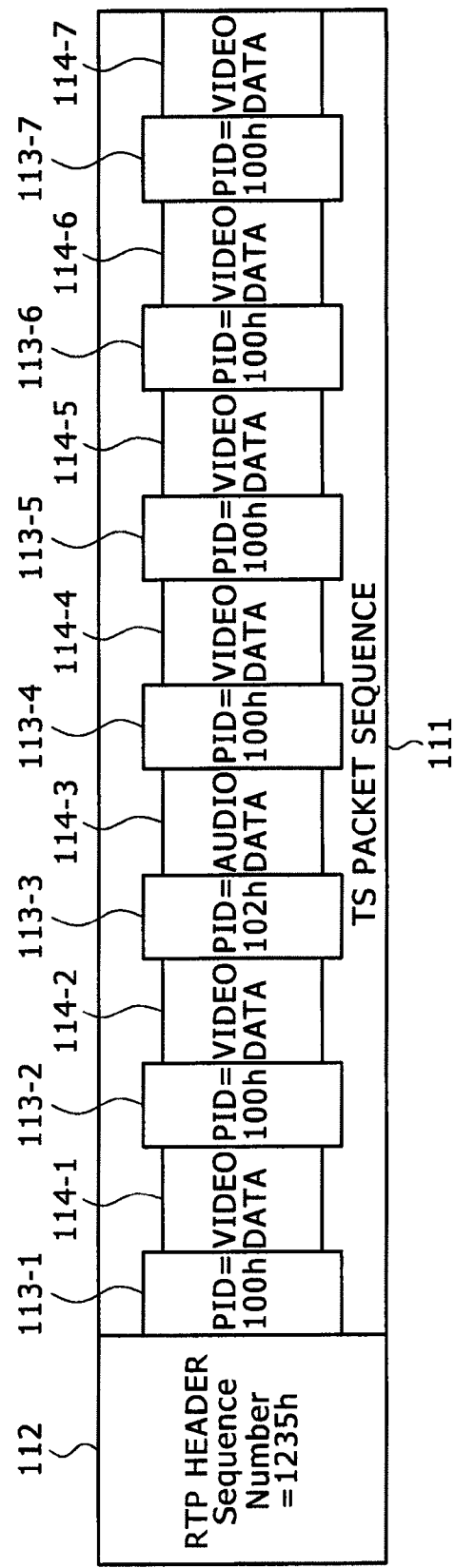
FIG. 12 is an explanatory view of another packet structure.

The RTP packet supplemented with the RTP header 42 is fed to the UDP header supplementing unit 23 and redundancy control unit 27. Below is an explanation of the RTP packet supplied to the UDP header supplementing unit 23 and redundancy control unit 27. FIGS. 11 and 12 schematically show typical structures of the RTP packet.

FIG. 11 shows a structure of an RTP packet formed by a TS packet sequence 101 supplemented with an RTP header 102. The TS packet sequence 101 in the RTP packet of FIG. 11 is made up of video data parts 104-1 through 104-7 supplemented with headers 103-1 through 103-7 respectively. The headers 103-1 through 103-7 contain the data fields such as those shown in the header part 61 of FIG. 4. Of these data fields, the "PID" field is set for "100h" in this example.

As described above with reference to FIG. 4, the value of the "PID" field in the header part 61 is determined in a manner which is dependent on the data in the data part 62 following the header part 61. If the data part 62 has video data, then the PID value is assumed to be "100h"; if the data part 62 has audio data, the PID value is assumed to be "102h."

The PID values may be any values as long as they can be distinguished between the sender apparatus 1 and the receiver apparatus 2. These values are set by the MPEG encoder 21. Since the data parts 62 in the TS packets constituting the TS packet sequence 101 of FIG. 11 contain only video data, the "PID" fields in the headers 103-1 through 103-7 are all set for "100h."

By contrast, a TS packet sequence 111 shown in FIG. 12 contains an audio data part 114-3. A header 113-3 attached to the audio data part 114-3 has its PID value set for "102h."

Video data usually occurs in larger quantity than concomitant audio data. For that reason, it is generally the case that the TS packet sequence 101 either contains only video data packets as shown in FIG. 11, or includes one or a few audio data packets among the TS packets making up the TS packet sequence 111 as indicated in FIG. 12.

The "sequence number" field in the RTP packet of FIG. 11 is assigned a value of "1234h." If the RTP packet of FIG. 12 is generated immediately after the RTP packet of FIG. 11, then the "sequence number" field in an RTP header 112 of the RTP packet in FIG. 12 is assigned a value of "1235h," a serial number continuous to the preceding value "1234h."

An RTP packet formed solely by video data parts as shown in FIG. 11, or an RTP packet constituted by video and audio data parts as indicated in FIG. 12, is generated by the RTP header supplementing unit 22. The generated RTP packet is supplied to the UDP header supplementing unit 23 and redundancy control unit 27. The UDP header supplementing unit 23 supplements the supplied RTP packet with a UDP header and forwards the UDP header-furnished packet to the IP header supplementing unit 24. The IP header supplementing unit 24 supplements the received UDP packet with an IP header before sending the IP header-furnished packet to the MAC header supplementing unit 25.

The MAC header supplementing unit 25 supplements the received IP packet with a MAC header and feeds the MAC header-furnished packet to the communication unit 26. Given the MAC packet, the communication unit 26 executes a first transmission of the supplied packet to the receiver apparatus 2.

Figure 13:
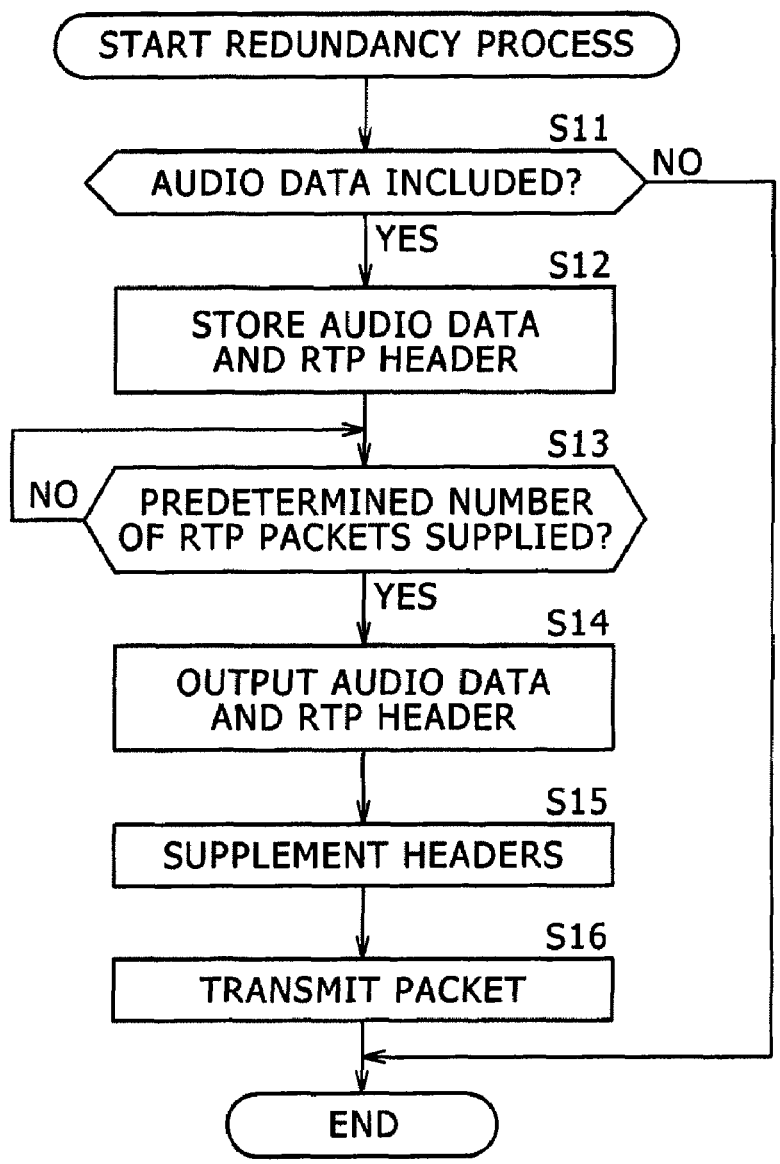
FIG. 13 is a flowchart of steps constituting a redundancy process.

How the sender apparatus 1 performs a second transmission of the packet will now be described by referring to the flowchart of FIG. 13. The steps outlined in FIG. 13 are carried out primarily by the redundancy control unit 27. The process constituted by the steps in FIG. 13 is executed on each RTP packet output by the RTP header supplementing unit 22. For the flowchart of FIG. 13, it is assumed that only audio data is subject to the second transmission.

In step S11, the redundancy control unit 27 checks to determine whether or not the RTP packet coming from the RTP header supplementing unit 22 includes audio data. The result of the check in step S11 is negative (NO) if the RTP packet supplied to the redundancy control unit 27 includes the TS packet sequence 101 constituted solely by the video data parts 104-1 through 104-7 as shown in FIG. If the RTP packet sent to the redundancy control unit 27 includes the TS packet sequence 111 containing the audio data part 114-3 as indicated in FIG. 12, then the result of the check in step S11 is affirmative (YES).

The redundancy control unit 27 determines whether or not audio data is included in the supplied RTP packet by referencing the "PID" field in the header of each of the TS packets involved. A TS packet whose "PID" field is set for "100h" is deemed to have video data; a TS packet with its "PID" field set for "102h" is deemed to have audio data.

If in step S11 the redundancy control unit 27 determines that the supplied RTP packet does not include any audio data, then the unit 27 discards the RTP packet and terminates the process (of the flowchart in FIG. 13) on the RTP packet in question.

If in step S11 the redundancy control unit 27 determines that the supplied RTP packet includes audio data, then step S12 is reached. In step S12, the redundancy control unit 27 extracts the RTP header and the audio data part (i.e., the TS packet containing the audio data) from the supplied RTP packet and stores what is extracted into the storage unit 28.

Figure 14B:
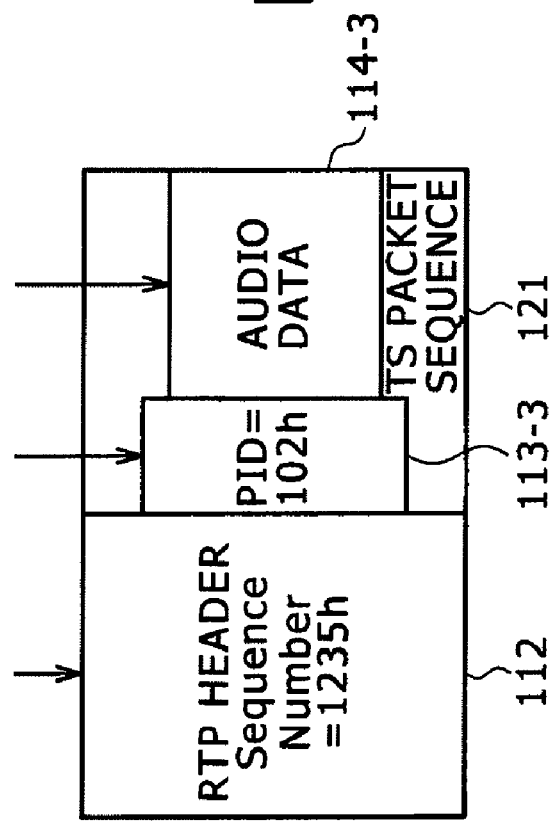

What takes place in steps S11 and S12 is explained below in more detail with reference to FIGS. 14A and 14B. FIG. 14A shows the same RTP packet as that in FIG. 12. The TS packet sequence 111 in the RTP packet of FIG. 14A includes the audio data part 114-3 (with the header 113-3 having its "PID" field set for "102h"). The sequence number of the RTP header 112 for the TS packet sequence 111 containing the audio data part 114-3 is set for "1235h."

Where the audio data part 114-3 is included in the RTP packet as described above, the storage unit 28 receives and accommodates the supplied RTP header 112, audio data part 114-3, and the header 113-3 attached to the audio data part 114-3.

Upon storage into the storage unit 28, a TS packet sequence 121 is generated which contains only the audio data part 114-3 and header 113-3, supplemented with the RTP header 112.

The redundancy control unit 27 may generate the RTP packet of FIG. 14B from the RTP packet of FIG. 14A either by eliminating the unnecessary data (i.e., the video data parts and the headers attached to them), or by extracting the necessary data (i.e., the audio data part and the header attached to it).

After the RTP packet containing the audio data alone is stored into the storage unit 28 as described, step S13 is reached. In step S13, the redundancy control unit 27 checks to determine whether a predetermined number of RTP packets have been output (i.e., supplied). The redundancy control unit 27 may carry out the check of step S13 by counting the number of supplied RTP packets.

Alternatively, the redundancy control unit 27 may perform the check of step S13 by referencing the sequence number in the RTP header 42 of each RTP packet. For example, a predetermined value may be added to the sequence number of the RTP packet stored in the storage unit 28. The check of step S13 is then executed by determining whether the RTP packet containing the sequence number derived from the addition is supplied.

If in step S13 the redundancy control unit 27 finds that the predetermined number of RTP packets have been supplied, step S14 is reached. It should be noted that even as the check of step S13 is being carried out, the process of the flowchart in FIG. 13 is continued on the RTP packet fed to the redundancy control unit 27.

In step S14, the RTP packet including the TS packet sequence containing the audio data alone is retrieved from the storage unit 28 in which the RTP packet in question was stored earlier in step S12. In this case, the TS packet sequence 121 and the RTP header 112 attached to it as shown in FIG. 14B are retrieved from storage.

The retrieved RTP packet is sent to the UDP header supplementing unit 23. After the RTP packet is supplied to the UDP header supplementing unit 23, the same process as the first-time transmission takes place.

That is, in step S15, the RTP packet acquired from the storage unit 28 is supplemented with headers by the UDP header supplementing unit 23, IP header supplementing unit 24, and MAC header supplementing unit 25. In step S16, the MAC packet is transmitted to the receiver apparatus 2 by the communication unit 26.

The second transmission is carried out as described above. In this example, the first transmission of the data including the RTP packet of FIG. 12 (MAC packet) is followed by the second transmission of the data including the RTP packet of FIG. 14B. Thus the audio data part 114-3 is transmitted twice to the receiver apparatus 2.

With this embodiment of the invention, the same audio data is sent twice to the receiver apparatus 2 as described. Alternatively, the same data may be transmitted three times or more. Specifically, steps S13 through S16 may be carried out as many times as needed on one RTP packet held in the storage unit 28 for repeated transmissions.

The same audio data is transmitted a plurality of number of times for the following reasons: communications are performed wirelessly between the sender apparatus 1 and the receiver apparatus 2. Generally, wireless communications are not as stable as communications over wires. Obstructions coming between the sender apparatus 1 and the receiver apparatus 2 can deteriorate the status of communication therebetween. The unstable communication can even result in the inability of the receiver apparatus 2 to receive the transmitted data.

Video data, even with some of its portions gone missing, rarely causes image interruptions in the video being offered to the user because the data is processed during decoding so as to compensate for data dropouts. By contrast, audio data, with some of its portions lost, is likely to trigger sound interruptions in the audio being offered to the user even after a compensatory process similar to the one performed on video data is carried out.

Audio data is thus more likely to exert adverse effects on the ongoing data reproduction than video data when data dropouts take place. For that reason, this embodiment of the invention is arranged to transmit audio data alone a plurality of number of times. Another reason for repeatedly transmitting audio data alone is related to different types of data occurring in different quantities.

More specifically, video data as it generally occurs is greater in quantity than the audio data occurring concomitantly. If the video data were to be transmitted a plurality of number of times, i.e., if all data were to be transmitted twice or more, the transmitting capacity of the sender apparatus 1 or the receiving capacity of the receiver apparatus 2, or both, might be overwhelmed when the apparatuses attempt to carry out the repeated operations.

In other words, if the transmitting capacity of the sender apparatus 1 and the receiving capacity of the receiver apparatus 2 are large enough to deal with the repeated handling of all data, then the two apparatuses may be arranged to transmit and receive all data in repetitive fashion.

All data transmission at a plurality of number of times implemented as follows: all RTP packets may be temporally stored in the storage unit 28 without implementing the determination at step S11 and the subsequent processes are implemented.

If all data is to be transmitted a plurality of number of times, the MAC packet instead of the RTP packet may be stored into the storage unit 28. That is, the sender apparatus 1 may be structured in such a manner that the storage unit 28 accommodates the MAC packet coming from the MAC header supplementing unit 25 and that the stored MAC packet is then output to the communication unit 26.

The description will be resumed hereunder on the assumption that audio data alone is transmitted a plurality of number of times (e.g., twice).

As described, the same audio data is transmitted at least twice by the sender apparatus 1. Following the first transmission (performed in a normally timed manner), the timing for the second transmission (i.e., when to transmit the data again for redundancy) is determined (controlled) in step S13 (of FIG. 13).

FIG. 15 shows an RTP packet structure in effect when a second transmission is performed immediately after the first transmission. For the ensuing explanation, it is assumed that the RTP packet of FIG. 12 is sent following transmission of the RTP packet of FIG. 11 (i.e., after the redundancy control unit 27 has performed its process).

The RTP header 102 of the RTP packet shown in FIG. 11 has the sequence number "1234h". This RTP header 102 is attached to the TS packet sequence 101. What is sent (i.e., processed) next is the RTP packet shown in FIG. 12. It follows that the RTP header 112 of the next RTP packet has the sequence number "1235h" and that the RTP header 112 is attached to the TS packet sequence 111.

The RTP packet of FIG. 12 contains audio data, so that the RTP packet shown in FIG. 14B is stored into the storage unit 28 under control of the redundancy control unit 27. The stored RTP packet, i.e., the TS packet sequence 121 prefixed with the RTP header 112, is arranged to be sent immediately following the TS packet sequence 111 as illustrated in FIG. 15.

Of the RTP headers shown in FIG. 15, the RTP headers 112 having the same sequence number "1235h" are transmitted continuously. In such a case, step S13 in the flowchart of FIG. 13 need not be carried out. That is, the RTP packet held in the storage unit 28 need only be forwarded to the UDP header supplementing unit 23 immediately after the RTP packet having the same sequence number has been output by the UDP header supplementing unit 23.

However, it is prudent to assume that the situation where the incoming data cannot be received by the receiver apparatus 2 for some reason, i.e., a state in which packets have gone missing, will not be improved in a short time. In other words, in a situation where packets tend to drop out, not one packet but a plurality of packets will likely drop out in a row. On the basis of past experience, when packets start to drop out, 10 to 15 RTP packets are likely to go missing consecutively.

Under such circumstances, the repeated transmissions of audio data to compensate for packet dropouts can be meaningless unless they are properly timed.

Referring again to FIG. 15, if an RTP packet prefixed with the RTP header 112 goes missing and another RTP packet prefixed with the same RTP header 112 is sent immediately thereafter, it is highly likely that the second RTP packet will also be lost in transit. When the compensatory packets tend to be lost as well, the repeated transmissions of the same data will have little meaning.

In other words, where at least audio data is to be sent twice to counter possible packet dropouts, it may be more effective to make the second transmission, say, 15 RTP packets after the first transmission. When a predetermined interval is interposed between the first and the second transmissions, even if an RTP packet sent first has gone missing, the same RTP packet transmitted a second time will likely be received normally.

Step S13 (of FIG. 13) is provided in view of such eventualities. Step S13 may be carried out illustratively by the redundancy control unit 27 checking to determine whether or not a predetermined number (e.g., 15) of RTP packets have been supplied.

FIG. 16 shows an RTP packet structure in effect when a second transmission of an RTP packet takes place after a predetermined number of RTP packets were transmitted earlier. Of the RTP headers shown in FIG. 16, those with reference numerals 102, 112 and 132 have sequence numbers that are serially continuous. That is, the packet sequences prefixed with these headers are transmitted in the order in which they have been processed.

After the predetermined number of RTP packets have been transmitted, the RTP header 112 with the sequence number "1235h" is sent again. Even if the RTP header 112 (i.e., TS packet sequence 111) immediately following transmission of the RTP header 102 has gone missing for some reason, the same RTP header 112 (i.e., TS packet sequence 121) is more likely to be received normally thanks to the communication state supposedly improved over time.

If at least one of the packets handled in the first and the second transmissions can be received, that means there is practically no audio data dropout. This arrangement forestalls irregularities such as sound disconnections in the audio being offered to the user.

Figure 17:
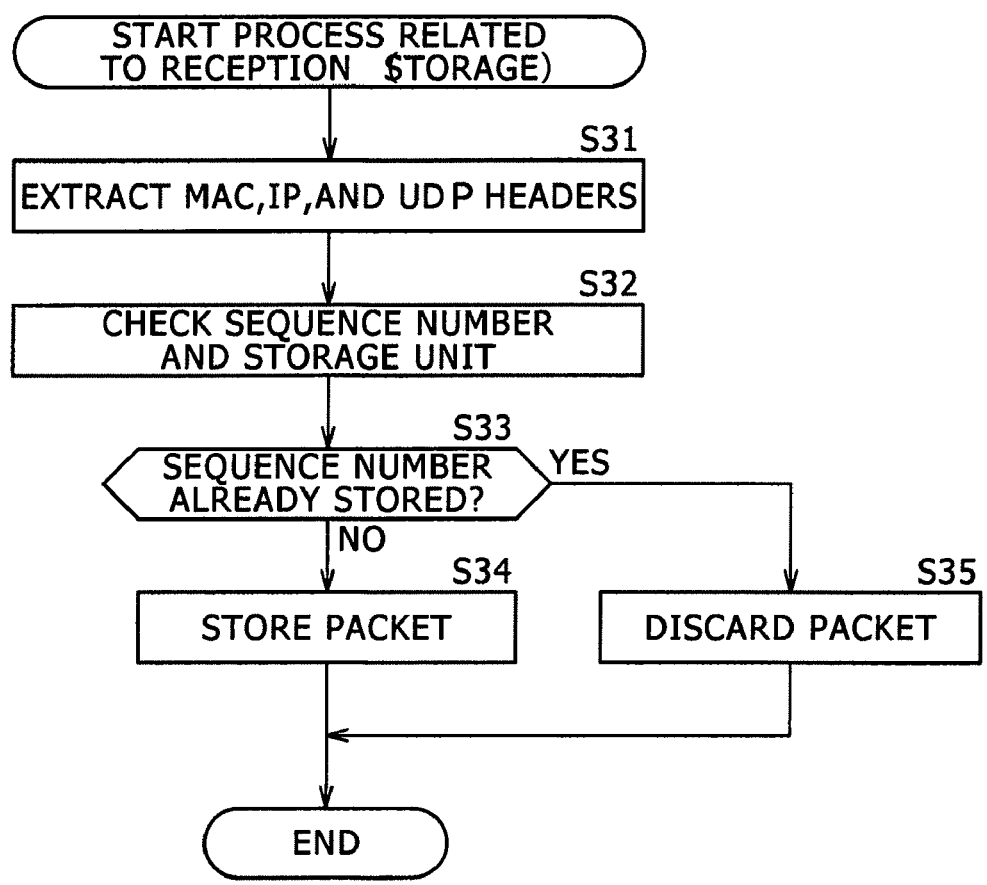
FIG. 17 is a flowchart of steps constituting a storage process.

Below is a description of how the receiver apparatus 2 receives and handles predetermined data being transmitted a plurality of number of times. FIG. 17 is a flowchart of steps in which the receiver apparatus 2 typically operates. In step S31, the data (MAC packet) sent from the sender apparatus 1 and received by the communication unit 81 (FIG. 9) is supplied to the MAC header extraction unit 82.

The MAC header extraction unit 82 extracts the MAC header 45 from the supplied MAC packet and forwards the resulting IP packet to the IP header extraction unit 83. The IP header extraction unit 83 extracts the IP header 44 from the supplied IP packet and sends the resulting UDP packet to the UDP header extraction unit 84. The UDP header extraction unit 84 extracts the UDP header 43 from the supplied UDP packet and feeds the resulting RTP packet to the sequence reconstitution unit 85.

As described, the headers are removed from the supplied data successively by the relevant components. These components handle the extracted headers in their own ways which, however, are not directly relevant to this invention and thus will not be discussed further.

In step S32, the sequence reconstitution unit 85 references the RTP header 42 in the supplied RTP packet. What is referenced at this point is the sequence number inside the RTP header 42. In step S33, the sequence reconstitution unit 85 references the storage unit 87 to determine whether or not the TS packets have already been stored therein in conjunction with the referenced sequence number.

As explained above with reference to FIG. 10, the storage unit 87 has a sequence number stored in association with a TS packet sequence 41 (FIG. 3) prefixed with the RTP header 42 having that sequence number. In steps S32 and S33, the sequence reconstitution unit 85 therefore references the sequence number in the RTP header 42 of the supplied RTP packet and checks to determines whether the TS packet sequence 41 corresponding to the referenced sequence number is stored in the storage unit 87.

If in step S33 the TS packet sequence 41 corresponding to the sequence number held in the supplied RTP header 42 is not found in the storage unit 87, then step S34 is reached. In step S34, the sequence reconstitution unit 85 sends the supplied RTP packet to the RTP header extraction unit 86.

The RTP header extraction unit 86 extracts the RTP header 42 from the supplied RTP packet and sends the resulting TS packet sequence 41 to the storage unit 87 for storage therein. At this point, the TS packet sequence 41 is placed into the storage unit 87 in conjunction with the sequence number contained in the RTP header 42.

What follows is a supplementary explanation for the steps up to the storage process above. There are two conceivable situations in which the sequence reconstitution unit 85 determines that the TS packet sequence 41 associated with the sequence number in the supplied RTP header 42 is not stored in the storage unit 87.

One such situation is where the new RTP packet (i.e., TS packet sequence 41) is supplied too early to be placed into the storage unit 87. The other situation is one in which the TS packet sequence 41 that should have already been received, processed and stored has yet to be received for some reason, that is, the TS packet sequence 41 has gone missing, and is thus not found in the storage unit 87.

In the second situation above, the sequence number itself is already placed in the storage unit 87. Referring again to FIG. 10, what is shown here is the state in which the TS packet sequence 41 to be stored in conjunction with the sequence number "3" (i.e., the TS packet sequence that should be made up of the TS packets 51-1-3 through 51-7-3) seems to have dropped out and has yet to be placed into storage. The storage area in which to place the apparently-lost packets is managed (i.e., allocated) in association with the corresponding sequence number.

If step S34 is reached in the second situation above, the sequence reconstitution unit 85 (or the RTP header extraction unit 86) causes the TS packet sequence 41 in the supplied RTP packet to be stored into an appropriate storage area allocated in the storage unit 87 in conjunction with the sequence number in the RTP header 42 attached to the RTP packet in question.

That is, in the case above, the TS packet sequence 41 received subsequently is placed into a storage area allocated in such a manner that its content will be sent to the MPEG decoder 88 ahead of the TS packet sequence 41 being processed at present.

The subsequently-received TS packet sequence 41 (i.e., the one received in the second transmission) has audio data alone. Thus only the TS packets 51 containing the audio data are stored. If video data is to be transmitted a plurality of number of times as well, the video data will also be stored (i.e., the TS packet sequence 41 will be stored).

As described, the missing packets may be acquired and stored into the storage unit 87 upon receipt and necessary processing following the subsequent retransmission. This makes it possible to avoid the adverse effects of packets dropping out in transit.

Returning to step S33 in the explanation of the flowchart of FIG. 17, the sequence reconstitution unit 85 checks to determine whether the TS packet sequence 41 corresponding to the sequence number in the supplied RTP header 42 is already stored in the storage unit 87. If the corresponding TS packet sequence 41 is deemed to exist in the storage unit 87, step S35 is reached.

The foregoing state is one in which both the first-transmitted and the second-transmitted packets have been normally received, processed and stored. In this case, there is no need to take steps to place the retransmitted packet into the storage unit 87. The sequence reconstitution unit 85 thus discards the supplied RTP packet in step S35.

When the foregoing steps are carried out by the receiver apparatus 2, it is possible to minimize the adverse effects of the packet dropouts because the retransmitted packets are received and processed. At the same time, it is also possible not to appropriate an inordinately large portion of the available processing capabilities for dealing with the missing packets.

In the foregoing example, predetermined data was shown transmitted a plurality of number of times (e.g., twice). In practice, it is necessary to consider putting constraints on the number of times the data may be transmitted. If the data is to be transmitted twice, it is necessary further to consider an appropriate time interval between the first and the second transmissions.

The considerations above are needed for the following reasons: The TS packets held in the storage unit 87 are supplied consecutively to the MPEG decoder 88.

Referring again to FIG. 10, the TS packets 51-1-1 through 51-7-1 associated with the sequence number "1" are first supplied to the MPEG decoder 88. Then the TS packets 51-1-2 through 51-7-2 associated with the sequence number "2" are fed to the MPEG decoder 88.

After that, the TS packets corresponding to the sequence number "3" should be supplied to the MPEG decoder 88. Since the corresponding TS packets are not found in storage when it is time for them to be fed to the MPEG decoder 88, they are skipped and the TS packets 51-1-4 through 51-7-4 associated with the next sequence number "4" are output instead.

In other words, if the TS packets associated with the sequence number "3" are not placed into the storage unit 87 before the TS packets associated with the sequence number "4" are timed to be fed to the MPEG decoder 88, there is no need subsequently to acquire the missing packets or to carry out steps in connection with the packet dropouts.

With these things taken into account, if the same packet is to be sent a plurality of number of times by the sender apparatus 1, the number of times the packet is transmitted needs to be determined in consideration of the capacity of the storage unit 87 in the receiver apparatus 2.

For example, if the storage unit 87 has a capacity large enough to accommodate one second of packet data, then there is no meaning in the attempt by the sender apparatus 1 to send the same packet upon elapse of one second or longer. In that case, if the same packet is set to be retransmitted at intervals of 100 milliseconds (e.g., where the number of RTP packets processed in a 100-millisecond interval is predetermined for step S13 in FIG. 13), then the number of times the packet is retransmitted may be set for nine.

That is, a tenth transmission, even if executed by the sender side and received by the receiver apparatus 2, results in meaningless processing. There need only be provided constraints that block the tenth transmission. If the transmission is set to be made twice, the two transmissions need only be performed (i.e., completed) within one second.

The number of times data is retransmitted and the interval between the repeated transmissions should preferably be established in consideration of the time required for the receiver apparatus 2 to store the received data, as well as the time required for both the sender and the receiver sides to handle the packet during transmission and reception. Such considerations should be added to those discussed above.

What follows is a supplementary explanation of how the receiver apparatus 2 operates. Although step S33 above (FIG. 17) was shown carried out by the sequence reconstitution unit 85 referencing the storage unit 87, this is not limitative of the invention. Alternatively, step S33 may be executed without reference to the storage unit 87 in a manner that will be explained below.

Since the sequence reconstitution unit 85 references the sequence number in the RTP header 42 of each RTP packet supplied, the unit 85 itself may be so structured as to store the referenced sequence numbers. With this structure, the sequence reconstitution unit 85 may perform step S33 by determining whether or not the sequence number included in the supplied RTP header 42 matches one of the sequence numbers currently retained inside.

With the above structure in place, the other steps are carried out basically in the same manner as in the examples explained earlier. These steps will not be discussed further.

As another alternative, step S33 may be performed by also taking advantage of the fact that the sequence reconstitution unit 85 references the sequence number in each RTP header 42 supplied. In this case, the sequence reconstitution unit 85 may check to determine whether the sequence number in the supplied RTP header 42 is serially continuous to the sequence number in the immediately preceding RTP header 42.

The sender apparatus 1 assigns sequence numbers illustratively in ascending order (alternatively in descending order) to packets which are transmitted as they are processed. The packets are supposed to be received and processed by the receiver apparatus 2 in the order in which they were transmitted. Any missing packet thus leaves the corresponding sequence number undetected. That is, the continuity of sequence numbers is disrupted.

On detecting a disruption of sequence number continuity, the sequence reconstitution unit 85 calculates and holds the sequence number that should normally be detected in the interrupted part. When sensing the continuity disruption, the sequence reconstitution unit 85 checks to determine whether the sequence number in the supplied RTP header 42 matches one of the sequence numbers currently held inside.

After the steps carried out as described above, the sequence reconstitution unit 85 may find that the sequence number in the supplied RTP header 42 matches one of the currently-held sequence numbers. That means the sequence reconstitution unit 85 has determined that the missing packet was retransmitted and received. In that case, the TS packet sequence 41 included in the supplied RTP packet is arranged to be stored into an appropriate area of the storage unit 87.

Some alternative ways to handle the packet retransmitted a number of times have been discussed above.

For the above-described embodiment of this invention, it is audio data that is transmitted a plurality of number of times for redundancy. Alternatively, video data may also be transmitted twice or more often. As another alternative, something other than audio data or video data (e.g., information contained in the header) may be transmitted a number of times.

For example, text broadcast data or EPG (Electronic Program Guide) data may be transmitted a plurality of number of times. Where particular information other than audio data is to be transmitted a number of times, step S11 of FIG. 13 may be modified to determine whether or not that particular information is included. The modified step S11 may then be followed by the same subsequent steps discussed above.

The principal reason for the embodiment above to have audio data transmitted a plurality of number of times is the relatively small amount of audio data compared with that of the concomitant video data. The repeated transmissions of audio data, because of its limited quantity, are deemed to have only negligible effects on other processing.

It is on that assumption that the above embodiment of the invention is structured to retransmit data whose amount is relatively small. It follows that this invention applies to setups in which not only audio data but any data occurring in limited quantities is transmitted a plurality of number of times.

In detecting data whose amount is small, arrangements may be made to predetermine the type of data deemed to occur in limited quantities (i.e., audio data in the examples above) and to see if that particular data is included in acquired data. Alternatively, a specific data amount (i.e., threshold level) may be established beforehand and checks may be carried out to determine if any data below that predetermined level is included in what has been acquired.

The data detected in the procedure above may then be stored. The stored data may be subsequently transmitted a plurality of number of times.

Where the foregoing procedure is in use, the repeated transmissions of data in a temporally staggered manner minimize adverse effects from data dropouts, such as disruptions in the video or audio being offered to the user. This makes it possible to improve the reliability of communication between the sender apparatus 1 and the receiver apparatus 2.

The series of steps and processes described above may be executed either by pieces of hardware with relevant capabilities or by software. For the software-based processing to take place, the programs constituting the software may be either incorporated beforehand in dedicated hardware of a computer or installed upon use from a suitable recording medium into a general-purpose personal computer or like equipment capable of executing diverse functions based on the installed programs.

Figure 18:
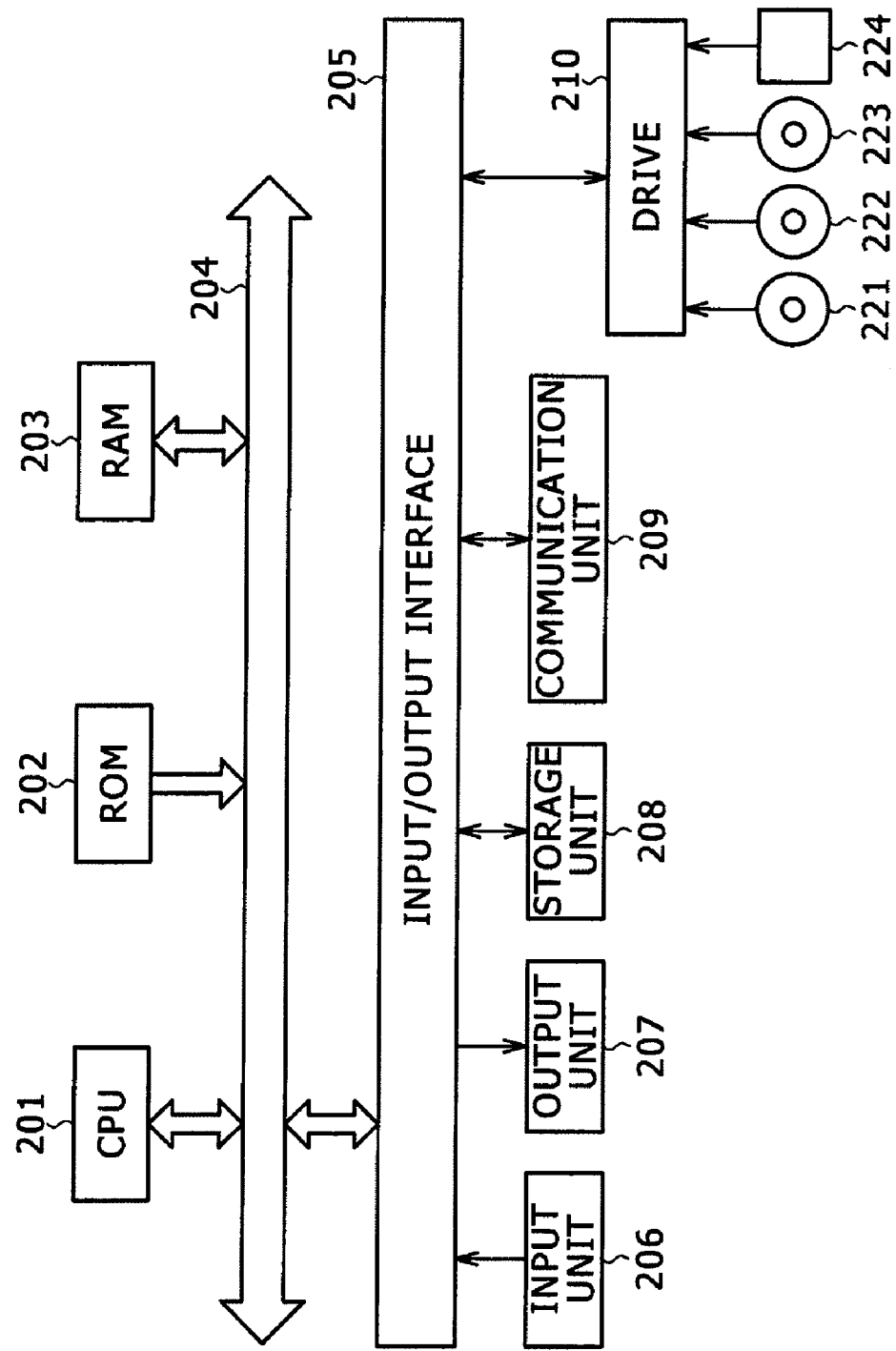
FIG. 18 is an explanatory view showing recording media that may be used.

The personal computer will now be discussed in brief, followed by an explanation of the recording medium. FIG. 18 shows a typical internal structure of a general-purpose personal computer. A CPU (central processing unit) 201 of the personal computer performs various processes in accordance with the programs held in a ROM (read only memory) 202. A RAM (random access memory) 203 accommodates data and programs that may be needed by the CPU 201 while carrying out its processing. An input/output interface 205 is connected with an input unit 206 made up of a keyboard and a mouse. Signals that are input to the input unit 206 are output to the CPU 201 through the input/output interface 205. The input/output interface 205 is also connected with an output unit 207 constituted by a display device and speakers.

Furthermore, the input/output unit 205 is connected with a storage unit 208 composed of a hard disk drive or like equipment, and with a communication unit 209 that sends and receives data to and from external devices over a network such as the Internet. A drive 210 is used to write and read data to and from the recording medium such as a magnetic disk 221, an optical disk 222, a magneto-optical disk 223, or a semiconductor memory 224 loaded in the drive.

As shown in FIG. 18, the recording medium is offered to the user apart from the personal computer not only as a package medium constituted by the magnetic disk 221 (including flexible disks), optical disk 222 (including CD-ROM (Compact Disc-Read Only Memory) and DVD (Digital Versatile Disc)), magneto-optical disk 223 (including MD (Mini-Disc; registered trademark)), or semiconductor memory 224, each medium carrying the necessary programs; but also in the form of the ROM 202 or the hard disk drive 31 containing the storage unit 208, both accommodating the programs and incorporated beforehand in the computer.

In this description, the steps which are stored on the recording medium and which describe the programs to be executed represent not only the processes that are to be carried out in the depicted sequence (i.e., on a time series basis) but also processes that may be performed parallelly or individually.

In this description, the term "system" refers to an entire configuration made up of a plurality of component devices.

INDUSTRIAL APPLICABILITY

The present invention provides arrangements for improving the reliability of communication. According to this invention, the data getting lost in transit is compensated so that disconnections or other disruptions will not occur in the video or audio being offered to the user.

The invention claimed is:

1. A sending-receiving system comprising a sender apparatus for transmitting data and a receiver apparatus for receiving said data transmitted by said sender apparatus;

wherein said sender apparatus includes:

an acquiring section for acquiring said data;

a supplementing section for supplementing acquired data acquired by said acquiring section with sequence information for indicating a sequence of said data;

a sending section for transmitting to said receiver apparatus said data supplemented with said sequence information by said supplementing section;

a determining section for determining whether or not predetermined data is included in said acquired data, the predetermined data having a particular field set as a predetermined value in the sequence information;

a storing section for storing said data supplemented with said sequence information by said supplementing section, wherein, when said determining section determines that the predetermined data is included in said acquired data, said storing section stores the predetermined data and a header attached to said predetermined data, and wherein, when said determining section determines that the predetermined data is not included in said acquired data, the supplemented data is discarded and said storing section does not store the supplemented data; and an ordering section for ordering said sending section to transmit the data retrieved from said storing section upon elapse of a predetermined time period following transmission of said data by said sending section; and wherein said receiver apparatus includes:

a receiving section for receiving said data transmitted by said sending section;

a determining section for determining whether or not said data received by said receiving section has been received already based on said sequence information extracted from said data; and a storage controlling section for discarding said data if said data received by said receiving section is found already received, said storage controlling section further storing said data if said data received by said receiving section is not found received already.

2. A sender apparatus comprising:

an acquiring section for acquiring data;

a supplementing section for supplementing acquired data acquired by said acquiring section with sequence information for indicating a sequence of said data;

a sending section for transmitting said data supplemented with said sequence information by said supplementing section;

a determining section for determining whether or not predetermined data is included in said acquired data, the predetermined data having a particular field set as a predetermined value in the sequence information;

a storing section for storing said data supplemented with said sequence information by said supplementing section, wherein, when said determining section determines that the predetermined data is included in said acquired data, said storing section stores the predetermined data and a header attached to said predetermined data, and wherein, when said determining section determines that the predetermined data is not included in said acquired data, the supplemented data is discarded and said storing section does not store the supplemented data; and an ordering section for ordering said sending section to transmit the data retrieved from said storing section upon elapse of a predetermined time period following transmission of said data by said sending section.

3. The sender apparatus according to claim 2, wherein said ordering section retrieves said predetermined data from said storing section and orders said sending section to transmit said predetermined data thus retrieved.

4. The sender apparatus according to claim 2, further comprising a determining section for determining whether or not audio data is included in said acquired data;

wherein, if said determining section determines that audio data is included in said data, then said storing section stores said audio data and a header attached to said audio data; and wherein said ordering section retrieves said header and said audio data from said storing section and orders said sending section to transmit the retrieved header and audio data.

5. The sender apparatus according to claim 4, wherein said header is an RTP header.

6. A sending method comprising the steps of:

controlling acquisition of data;

supplementing acquired data acquired in said acquisition controlling step with sequence information for indicating a sequence of said data;

controlling transmission of said data supplemented with said sequence information in said supplementing step;

determining whether or not predetermined data is included in said acquired data, the predetermined data having a particular field set as a predetermined value in the sequence information;

controlling storage of said data supplemented with said sequence information in said supplementing step, wherein, when the predetermined data is included in said acquired data, said controlling storage step stores the predetermined data and a header attached to said predetermined data, and wherein, when the predetermined data is not included in said acquired data, the supplemented data is discarded and said controlling storage step does not store the supplemented data; and ordering said transmission controlling step to transmit said data retrieved from storage under control of said storage controlling step upon elapse of a predetermined time period following transmission of said data in said transmission controlling step.

7. A recording medium which records a program in a manner readable by a computer, said program comprising the steps of:

controlling acquisition of data;

supplementing acquired data acquired in said acquisition controlling step with sequence information for indicating a sequence of said data;

controlling transmission of said data supplemented with said sequence information in said supplementing step;

determining whether or not predetermined data is included in said acquired data, the predetermined data having a particular field set as a predetermined value in the sequence information;

controlling storage of said data supplemented with said sequence information in said supplementing step, wherein, when the predetermined data is included in said acquired data, said controlling storage step stores the predetermined data and a header attached to said predetermined data, and wherein, when the predetermined data is not included in said acquired data, the supplemented data is discarded and said controlling storage step does not store the supplemented data; and ordering said transmission controlling step to transmit said data retrieved from storage under control of said storage controlling step upon elapse of a predetermined time period following transmission of said data in said transmission controlling step.

8. A computer-readable medium storing a computer program, the computer program comprising the steps of:

controlling acquisition of data;

supplementing acquired data acquired in said acquisition controlling step with sequence information for indicating a sequence of said data;

controlling transmission of said data supplemented with said sequence information in said supplementing step;

determining whether or not predetermined data is included in said acquired data, the predetermined data having a particular field set as a predetermined value in the sequence information;

controlling storage of said data supplemented with said sequence information in said supplementing step,
wherein, when the predetermined data is included in said acquired data, said controlling storage step stores the predetermined data and a header attached to said predetermined data, and
wherein, when the predetermined data is not included in said acquired data, the supplemented data is discarded and said controlling storage step does not store the supplemented data; and
ordering said transmission controlling step to transmit said data retrieved from storage under control of said storage controlling step upon elapse of a predetermined time period following transmission of said data in said transmission controlling step.

9. A receiver apparatus comprising:
receiving means for receiving predetermined data having a particular field set as a predetermined value in sequence information of the predetermined data;
determining means for determining whether or not said data received by said receiving means has been received already based on sequence information which is extracted from said data and which indicates a sequence of said data; and
storage controlling means for discarding said data if said data received by said receiving means is found already received, said storage controlling means further storing said data if said data received by said receiving means is not found received already.

10. The receiver apparatus according to claim 9, wherein, if continuity of said data received by said receiving means is found disrupted on the basis of said sequence information, then said determining means determines whether or not said data is the already-received data.

11. A receiving method comprising the steps of:
controlling reception of predetermined data having a particular field set as a predetermined value in sequence information of the predetermined data;
determining whether or not said data received in said reception controlling step has been received already based on sequence information which is extracted from said data and which indicates a sequence of said data; and
controlling storage of said data which is discarded if said determining step determines that said data received in said reception controlling step has been received already, said storage controlling step further storing said data if said data is not found received already.

12. A recording medium which records a program in a manner readable by a computer, said program comprising the steps of:
controlling reception of predetermined data having a particular field set as a predetermined value in sequence information of the predetermined data;
determining whether or not said data received in said reception controlling step has been received already based on sequence information which is extracted from said data and which indicates a sequence of said data; and
controlling storage of said data which is discarded if said determining step determines that said data received in said reception controlling step has been received already, said storage controlling step further storing said data if said data is not found received already.

13. A computer-readable medium storing a computer program, the computer program comprising the steps of:
controlling reception of predetermined data having a particular field set as a predetermined value in sequence information of the predetermined data;
determining whether or not said data received in said reception controlling step has been received already based on sequence information which is extracted from said data and which indicates a sequence of said data; and
controlling storage of said data which is discarded if said determining step determines that said data received in said reception controlling step has been received already, said storage controlling step further storing said data if said data is not found received already.

* * * * *